United States Patent
Paschek

[11] Patent Number: 6,164,699
[45] Date of Patent: Dec. 26, 2000

[54] DEFLECTION FITTING WITH AUTOMATIC ADJUSTING DEVICE

[75] Inventor: Joachim Paschek, Stuttgart, Germany

[73] Assignee: TRW Occupant Restraint Systems GmbH & Co. KG, Alfdorf, Germany

[21] Appl. No.: 09/312,346

[22] Filed: May 14, 1999

[30] Foreign Application Priority Data

May 15, 1998 [DE] Germany ............ 298 08 844 U

[51] Int. Cl.⁷ .................................................. B60R 22/20
[52] U.S. Cl. ........................................................ 280/801.2
[58] Field of Search ............................ 280/801.2, 804, 280/805, 806, 808; 297/470

[56] References Cited

U.S. PATENT DOCUMENTS

| | | | |
|---|---|---|---|
| 4,846,498 | 7/1989 | Fohl | 280/808 |
| 5,340,152 | 8/1994 | Fohl | 280/805 |
| 5,628,529 | 5/1997 | Golz et al. | 280/801.2 |
| 5,704,645 | 1/1998 | Arthurs et al. | 280/805 |

*Primary Examiner*—Brian L. Johnson
*Assistant Examiner*—Tony Winner
*Attorney, Agent, or Firm*—Tarolli, Sundheim, Covell, Tummino & Szabo L.L.P.

[57] ABSTRACT

A unit comprising a deflection fitting and an automatic adjusting device for safety belt systems in vehicles having at least one seat adjustable in longitudinal direction of the vehicle. The adjusting device has a traction transfer device with two ends, the first end of which being arrested on the seat and the second end of which being coupled with the deflection fitting, a locking device which is intended to prevent a displacement of the deflection fitting in the case of restraint, and a spring element on which the second end of the traction transfer means is arrested. The spring element is in turn fastened to one of the deflection fitting and a sliding carriage to which the deflection fitting is affixed. The spring element yields elastically in order to permit a relative movement of the traction cable and the deflection fitting upon an abrupt introduction of force into one of the deflection fitting and the traction cable.

5 Claims, 2 Drawing Sheets

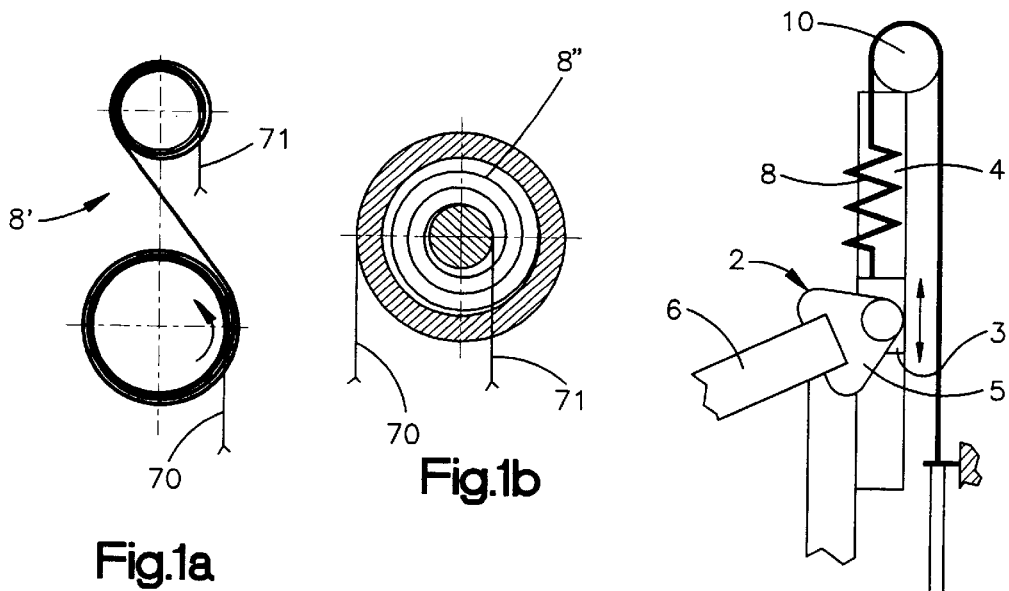
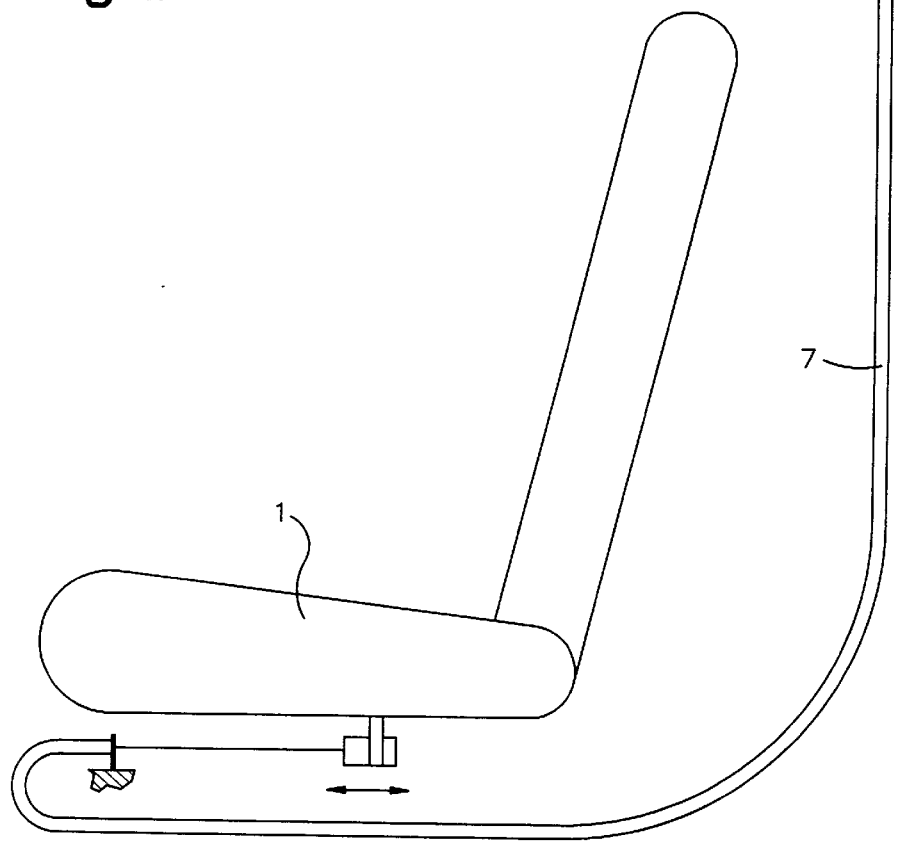

DEFLECTION FITTING WITH AUTOMATIC ADJUSTING DEVICE

TECHNICAL FIELD

The invention relates to a unit of a deflection fitting and an automatic adjusting device for safety belt systems in vehicles.

BACKGROUND OF THE INVENTION

From DE 44 35 910 A1 an automatically adjustable deflection fitting is already known. This serves to adjust the deflection fitting vertically in synchronism with the displacement of the vehicle seat. For this, a traction cable is coupled on the one hand with the vehicle seat and on the other hand with the deflection fitting. In the known deflection fitting, a roller coupling is provided between the end of the traction cable on the deflection fitting side and the deflection fitting itself, which roller coupling has a torque limitation. Thereby, the maximum transferable force is limited. The disadvantages of this deflection fitting together with adjusting device are the costly construction and the numerous parts.

DE 37 13 137 A1 shows an automatically adjustable deflection fitting with a spring arranged between a bowden cable and the vehicle seat to hold the bowden cable under tension and to act as an overload protection. However, the cable can be exerted to high loads despite provision of the spring due to the inertia mass of the cable in case of a belt tensioning process.

BRIEF SUMMARY OF THE INVENTION

The invention provides a unit of a deflection fitting with an automatic adjusting device which is simply constructed and is able to be manufactured at a favorable cost. The unit according to the invention comprises a deflection fitting and an automatic adjusting device for safety belt systems in vehicles having at least one seat adjustable in longitudinal direction of the vehicle. The adjusting device has a traction transfer means with two ends, the first end of which being arrested on the seat and the second end of which being coupled with the deflection fitting, a locking device which is intended lo prevent a displacement of the deflection fitting in the case of restraint, and a spring element on which the second end of the traction transfer means is arrested. The spring element is in turn fastened to one of the deflection fitting and a sliding carriage to which the deflection fitting is affixed. The spring element yields elastically in order to permit a relative movement of the traction cable and the deflection fitting upon an abrupt introduction of force into one of the deflection fitting and the traction cable.

Whereas in the prior art a costly coupling is provided between the traction cable and the deflection fitting, the invention merely provides for the intercalation of a spring element, e.g. a scroll, traction, driving or spiral spring. Thereby, in a simple manner, an overloading of the traction cable in the case of restraint is avoided, because the spring element forms an overload protection means which proves to be successful in particular in connection with retraction tensioners. With the combination of automatic vertical adjusting devices and retraction tensioners, in fact particularly high force peaks are produced which can act on the traction transfer means. Further, the spring element is immediately coupled to the defection fitting so that an introduction of high loads into the cable can be excluded.

Preferably, the spring element resets the deflection fitting after a completed force introduction and adjustment of the deflection fitting into its initial position.

Furthermore, provision is made that the relative movement which the spring element permits is not smaller than the maximum distance of the position of the non-locked deflection fitting to the next locking position. Thereby, a reaching of the next locking position is ensured.

BRIEF DESCRIPTION OF THE DRAWINGS

FIG. 1 shows a diagrammatic side view of a vehicle seat and of a deflection fitting together with automatic adjusting device both defining the unit according to the invention, and different spring elements (FIGS. 1a and 1b)

DETAILED DESCRIPTION OF A PREFERRED EMBODIMENT

Figure 2:
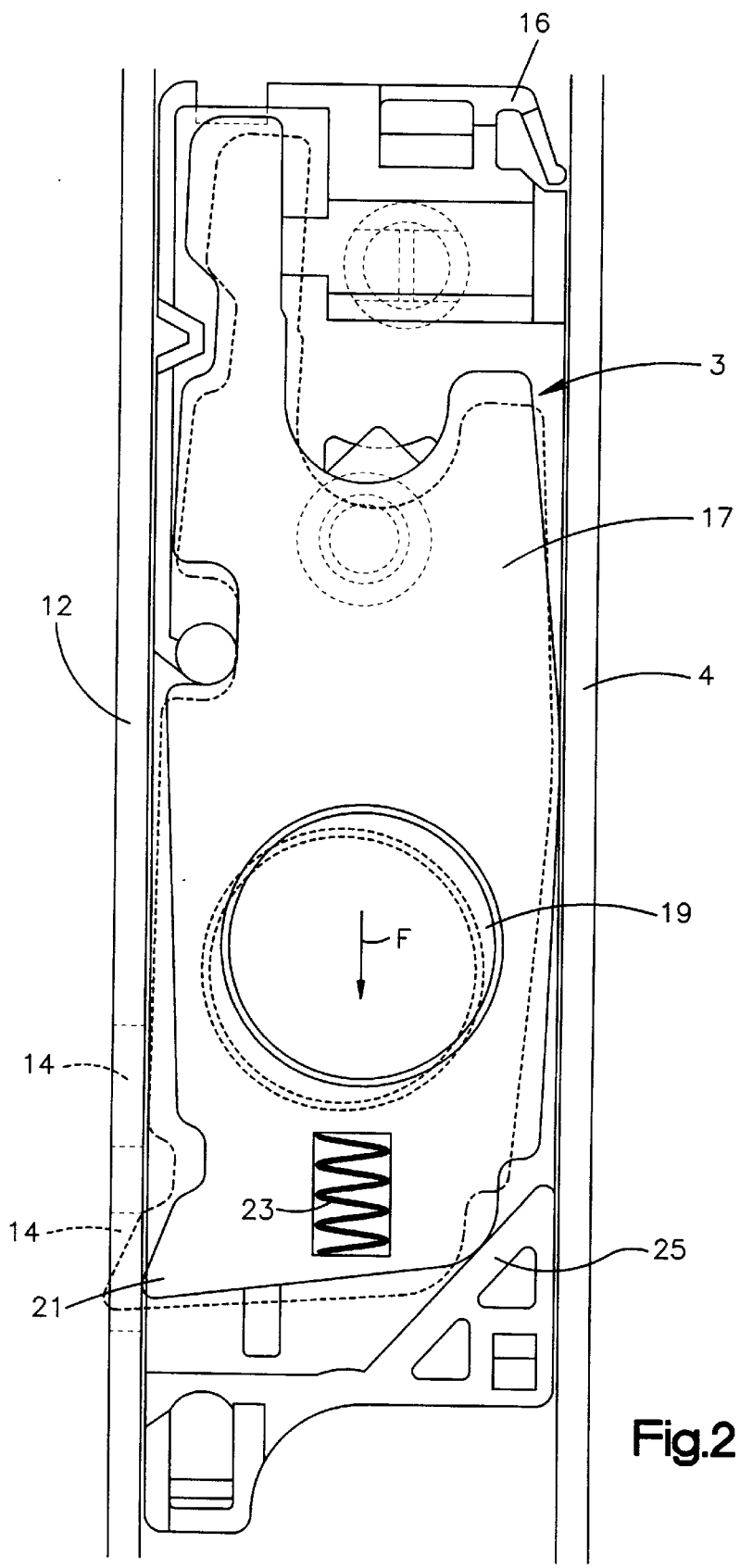
FIG. 2 shows a detail view of the deflection fitting and of the adjusting device in the region of the guide track.

In FIG. 1 a vehicle seat 1 is shown which is adjustable in longitudinal direction of the vehicle. The possibility of adjustment is symbolized by a double arrow F. A deflection fitting 2 of a 3-point safety belt comprises a sliding carriage 3 which is movable vertically in a track 4, and also a triangular fitting piece 5 on which the safety belt 6 is deflected. The deflection fitting and the automatic adjusting device define a unit. A Bowden cable with a traction cable 7 as traction transfer means connects the deflection fitting 2 with the seat 1 and couples their movements. The first, lower end of the traction cable 7 is fastened to the seat and the second, upper end to the upper end of a spring device in the form of a spring 8, which is constructed as a traction and spiral spring. The lower end of the spring is in turn arranged on the sliding carriage 3. A deflector scroll for the traction cable 7 is designated by 10. The spring 8 represents a type of protection means against overloading, which is intended to avoid too high stresses of the traction cable in the case of restraint. In FIGS. 1a and 1b a scroll spring 8' and a driving spring 8" are shown, respectively. The cable has two separate parts, the part 70 being coupled to the sliding carriage 3 of the deflection fitting and the part 71 being coupled to the vehicle seat.

The automatic vertical adjustment of the deflection fitting takes place by the adjustment of the seat 1. If the seat is moved forward, the deflection fitting 2 is automatically moved downwards by way of the traction cable 7 and vice versa.

In FIG. 2 the U-shaped track 4 can be seen, inside which the sliding carriage 3 is displaceably arranged. The track 4 has several uniformly spaced detent openings 14 on its left arm 12. The sliding carriage is composed of substantially three parts, namely a rear sliding part 16, a part 17 resting thereon, to which a bolt 19 is fixed which serves for the mounting of the fitting piece 5, and of a front part which is not shown. The part 17 has a detent nose 21 which projects slightly laterally and in the case of restraint can penetrate into a detent opening 14 and forms with it a locking device in order to achieve a locking of the sliding carriage 3. In the normal operating state, the detent nose 21 is out of engagement with the detent openings 14, in order to make possible a vertical adjustment. The part 17 and the rear part 16 are coupled with each other by means of a compression spring 23, the compression spring 23 positioning the part 17 relative to the part 16 such that the detent nose 21 is out of engagement with the detent openings 14. The part 16 has at its lower end, lying opposite the detent nose 21, a ramp surface 25 along which the part 17 can slide and moves to the left, if in the case of restraint a downwardly directed force F is exerted onto the part 17 via the belt, compresses the compression spring 23 and moves the detent nose 21 in the direction of the arm 12.

The spring 8 is, furthermore, fastened to the sliding part 17.

In the case of restraint, when an abrupt force F is transferred to the part 17 due to the inert mass of the occupant and due to the belt tensioning, an overloading of the traction cable 7 could occur prior to an engagement of the detent tooth 21. The spring 8 is designed such that with a normal seat adjustment it does not expand, or only expands negligibly, however in the case of an abrupt, high force introduction, as in the case of restraint, it expands so far that the traction cable 7 is not then overloaded. The spring 8 is so soft that it permits a displacement of the sliding carriage 3 into the next locking position in which the detent tooth 21 penetrates into the detent opening 14.

A further advantage of the spring 8 engaging directly on the deflection fitting consists in that after the restraining has been completed, the spring 8 directs the deflection fitting 2 back into the initial position again. A jerky pulling on the safety belt 6 therefore does not lead directly to the sliding carriage being permanently locked, rather it is returned by the spring 8 into its unlocked initial position.

A substantial advantage of the invention consists also in the arrangement of the spring, which is arranged directly on the deflection fitting 2 and not between the seat and the first end of the traction cable. With the latter, it is in fact disadvantageous that the spring only keeps the overload away from the traction cable 7 to an insufficient extent. The inert mass of the traction cable and its friction in the guide sleeve surrounding it lead to the fact that with the occurrence of a downwardly-directed force which acts on the sliding carriage 3, the traction cable 7 can be highly stressed, because the uncoupling from the seat by the spring in this case takes place at the end of the traction cable 7 opposed to the deflection fitting 2.

What is claimed is:

1. A unit comprising a deflection fitting and an automatic adjusting device for safety belt systems in vehicles having at least one seat adjustable in the longitudinal direction of the vehicle, said adjusting device having a traction transfer means with two ends, the first end of which being arrested on said seat and the second end of which being coupled with said deflection fitting, a locking device which is intended to prevent a displacement of said deflection fitting in the case of restraint, and a spring element on which said second end of said traction transfer means is connected, which spring element being in turn fastened to one of said deflection fitting and a sliding carriage to which said deflection fitting is affixed, and which spring element yielding elastically in order to permit a relative movement of said traction cable and said deflection fitting upon an abrupt introduction of force into one of said deflection fitting and said traction cable.

2. The deflection fitting according to claim 1, wherein said spring element is a scroll, traction, driving or spiral spring.

3. The deflection fitting according to claim 1, wherein said spring element is designed such that with an abrupt introduction of force into said deflection fitting it permits a displacement thereof and, after the force introduction has taken place, returns it into an initial position again.

4. The deflection fitting according to claim 1, wherein said deflection fitting has discrete, spaced locking positions and wherein said spring element is designed such that in the case of restraint said deflection fitting can move up to a next locking position.

5. The deflection fitting according to claim 1, wherein said deflection fitting has a fitting piece arid a sliding carriage which is displaceable in a track, on which sliding carriage said fitting piece is articulated, and wherein said spring element is fastened to said sliding carriage.

\* \* \* \* \*

UNITED STATES PATENT AND TRADEMARK OFFICE
CERTIFICATE OF CORRECTION

| | |
|---|---|
| PATENT NO. | : 6,164,699 |
| DATED | : December 26, 2000 |
| INVENTOR(S) | : Joachim Paschek |

It is certified that error appears in the above-identified patent and that said Letters Patent is hereby corrected as shown below:

<u>Column 4,</u>
Line 5, change "arrested" to -- connected --.
Line 35, change "arid" to -- and --.

Signed and Sealed this

Ninth Day of April, 2002

*Attest:*

*Attesting Officer*

JAMES E. ROGAN
*Director of the United States Patent and Trademark Office*